UNITED STATES PATENT OFFICE.

XAVIER KARCHESKI, OF BELLEVILLE, NEW JERSEY.

METHOD OF PREPARING COLORS FROM ANILIN.

Specification of Letters Patent No. 46,804, dated March 14, 1865.

*To all whom it may concern:*

Be it known that I, XAVIER KARCHESKI, of Belleville, county of Essex, State of New Jersey, have invented a new and Improved Mode of Preparing Paints and Colors from Anilin; and I do hereby declare that the following is a full and exact description thereof.

The nature of my invention consists in treating any white base, of which the paint or color is to be made with a gelatinous or fatty solution, vegetable or animal, before the application of anilin solution.

To enable others skilled in the art to make and use my invention, I will proceed to describe the mode of operation.

The white base is well mixed with starch water to this is added solution of tannic acid when all is thoroughly mixed, solution of anilin is to be added, lastly add to this mixture fresh milk, or dissolved glue if required and the anilin color will be fastened upon the base used.

What I claim as my invention and desire to secure by Letters Patent is—

The application of gelatinous or fatty solution vegetable or animal such as starch, tannic acid, milk or glue, etc., in preparing paints from anilin.

XAVIER KARCHESKI.

Witnesses:
J. LAGOWITZ,
L. SIERAWSKI.